Oct. 21, 1958     J. W. FIRTH ET AL     2,857,283
WINDOW DYED CASING
Filed Sept. 8, 1952
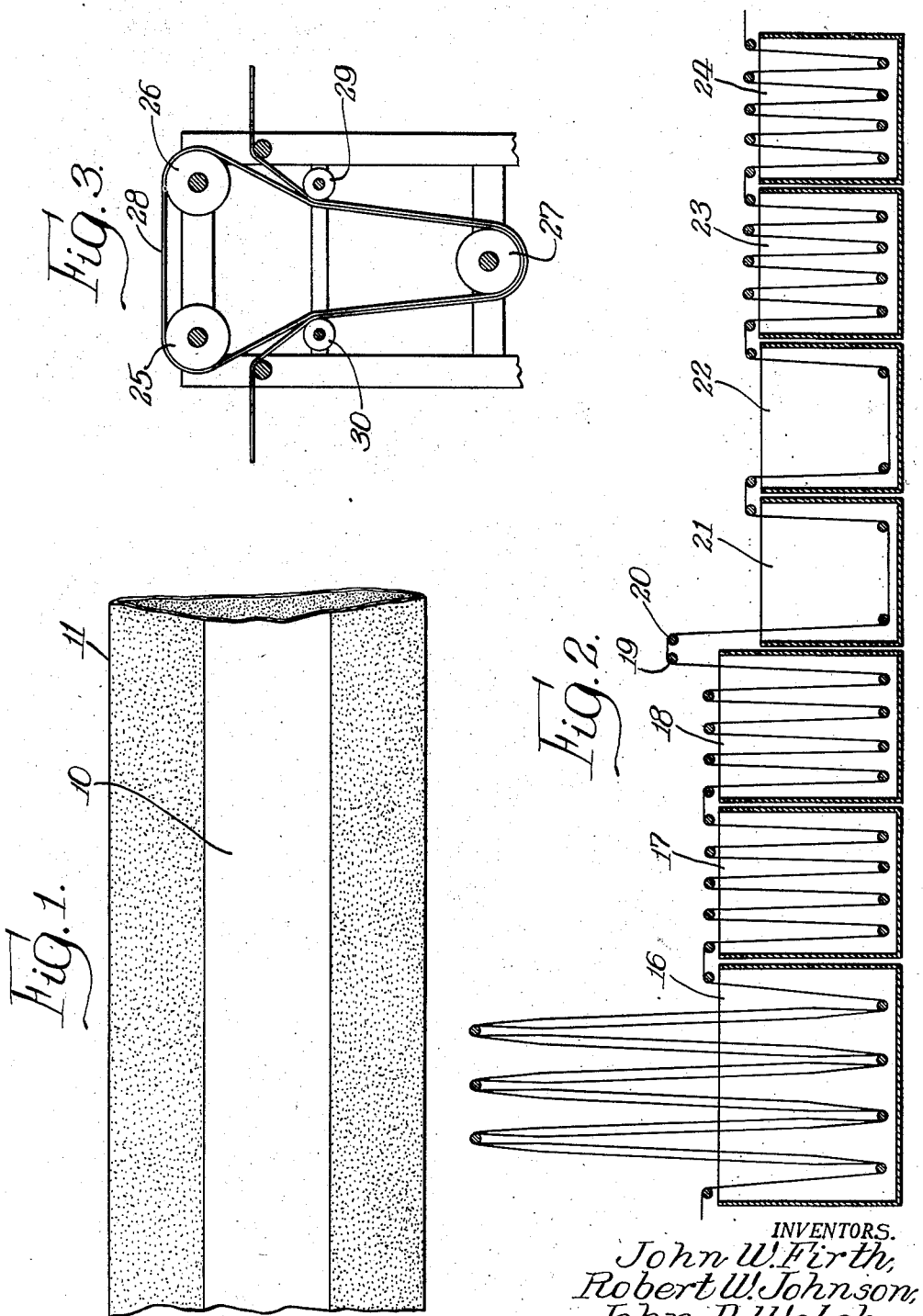
INVENTORS.
John W. Firth,
Robert W. Johnson,
John P. Welsh,
By Brown, Jackson, Boettcher & Dienner   Attys.

United States Patent Office 2,857,283
Patented Oct. 21, 1958

2,857,283

WINDOW DYED CASING

John W. Firth, Chicago, Robert W. Johnson, Tinley Park, and John P. Welsh, Westchester, Ill., assignors to Tee-Pak, Inc., a corporation of Illinois Application September 8, 1952, Serial No. 308,435

3 Claims. (Cl. 99—176)

This invention relates to dyed foodstuffs casings having a colorless window portion therein and to a process for producing such a window effect. More particularly, the invention relates to meat package casings of a tinted nature having a colorless window portion allowing for visual examination of the meat enclosed within said casing.

It has long been the practice of meat packers to encase their product in tubular transparent casings and with a view to enhancing their "eye appeal" such casings have been given a variety of colors by various dyeing methods. Conversely, for the protection of the customer certain States have prohibited the use of such tinted casings, insisting that the meat be contained in a colorless transparent envelope.

To overcome the objections to a completely colored casing and at the same time to retain the commercial advantages thereof a method was sought for introducing a colorless portion into the body of the completed casing. The uniformity in casing strength and the assurances of a complete sealing that are inherent where a seamless tubing is employed made impractical the bonding of a clear, colorless strip or portion into a separately dyed sheet of casing material.

Accordingly, it is an object of this invention to provide a seamless tubular casing having a dyed portion and another portion having its natural colorless constituency.

This and other related objects are achieved by the present invention wherein during the dyeing or coloring operation a colorless window strip or portion is preserved in the body of the foodstuffs casing through which window the contents of the casing can be visually examined.

In the way of explanation, it might first be stated that the method of making the casing in its original colorless state is not within the scope of this invention. Such colorless, seamless casing composed of regenerated cellulose is generally formed, as taught in U. S. Patent 1,937,225, by extrusion, in a semi-fluid state, of the selected material. By such extrusion process a thin-walled and transparent seamless tubing is produced which is subsequently collapsed to be handled in a flattened state. The particular process of our invention begins after the final hot water wash and prior to the plasticizer bath, as those stages are arranged in the aforementioned patent.

According to our invention, briefly stated, the fabricated casing as it leaves the water wash passes into a selected naphtholate dye which, without effecting any coloring of the casing, coats that portion of the casing surface which has not been protected by a mask of various materials to be subsequently described. The casing as coated then enters a color salt bath which color salt acting only in combination with the naphtholate dye on the surface of the casing produces a partially tinted or colored casing. The fact that the tubing or casing is passed through the dye baths in a collapsed state limits the coloring effect to make it a surface dyeing phenomenon. Preventing the dyes from permeating the tubular casing to thereby reach the inner surface is also assured by controlling the amount of time that the casing is subjected to the action of the dyes. This limitation on the time factor does not complicate the coloring problem since the final color intensity produced in the casing is basically dependent on dye concentration, the time that the casing is in the bath not being critical as to color strength achieved.

To more fully describe the invention reference is made to Fig. 1 which shows a window casing produced by the process to be described, the window portion being the center section and the stippled portion indicating the dyed or colored part of the completed casing.

Fig. 2 is a diagrammatic representation of the various steps of handling the flattened casing during the dyeing or coloring process.

Fig. 3 is an elevation of a device for maintaining pressure contact between a particular masking means and the casing as it passes through the dye bath.

With reference to Fig. 1 it is seen that the window portion in the preferred form has the appearance of a colorless band 10 continuous throughout the length of a piece of casing 11.

As shown in Fig. 2, the fabricated cellulose casing passes through regenerating bath 16 and water wash tanks 17 and 18 in which it is kept in a collapsed condition. After the regenerating medium has been washed from the film in this way, the masking means to be subsequently described are applied at a point represented by rollers 19 and 20. With the mask applied, the casing passes directly into tank 21 in which the selected naphtholate dye coats that portion of the casing left exposed as it enters the bath. The naphtholate is then coupled in tank 22 with the diazotized amines or color salts, as they are commonly called, the latter coupling to the naphtholate to produce the color on that part of the casing contacted by both the naphtholate and the diazo salts. In tank 23 water removes any excess dyes that remain on the casing and in tank 24 hygroscopic material such as glycerine is incorporated into the film to prevent brittleness in the dried casing. It can therefore be readily seen that whatever masking means are chosen to conceal and thereby produce the window portion in the dyed casing they may be applied to the casing either before it enters the naphtholate bath as shown in the drawings or they may be applied before the casing enters the color salt bath. In the first case, the mask precludes contact between the casing and the naphtholate and in the second situation, the naphtholate coated casing is protected from the diazo color salts which must react with naphtholate to produce a color effect.

To describe in greater detail and to clearly indicate the different colors that are obtainable by application of the preferred type of dyes in our invention, the following examples of dye bath formulations are included:

Suntan (Light Tan)

Naphtholate bath:

| | |
|---|---|
| Naphthol AS supra | gm./l 2.18 |
| Naphthol ASG supra | gm./l 0.31 |
| Cellosolve | gm./l 4.35 |
| Caustic soda | gm./l 4.01 |
| Nullapon A | gm./l 1.40 |
| Eunaphthol AS | cc./l 2.51 |

Diazo color salts bath:

| | |
|---|---|
| Fast Scarlet GGN | gm./l 27.5 |
| Fast Red BN | gm./l 27.5 |
| Common salt | gm./l 27.5 |
| Diazopon | cc./l 9.2 |
| 56% acetic acid (7.6 gm./l. acetic acid) | cc./l 12.8 |

Amber (Deep Orange)

Naphtholate bath:
- Naphthol AS supra _____ gm./l__ 1.54
- Naphthol ASG supra _____ gm./l__ 5.15
- Cellosolve _____ gm./l__ 8.72
- Nullapon A _____ gm./l__ 0.08
- Eunaphthol AS _____ cc./l__ 0.50
- Caustic soda _____ gm./l__ 5.30
- Igepal _____ cc./l__ 4.50

Diazo color salts bath:
- Fast Scarlet GGN _____ gm./l__ 36.7
- Fast Red BN _____ gm./l__ 36.7
- Common salt _____ gm./l__ 27.5
- Diazopon _____ cc./l__ 9.2
- 56% acetic acid (7.6 gm./l. acetic acid) cc./l__ 12.8

Red

Naphtholate bath:
- Naphthol AS supra _____ gm./l__ 15.37
- Cellosolve _____ gm./l__ 14.37
- Caustic soda _____ gm./l__ 6.68
- Nullapon A _____ gm./l__ 1.59
- Eunaphthol AS _____ cc./l__ 2.67

Diazo color salts bath:
- Fast Scarlet GGN _____ gm./l__ 36.7
- Fast Red BN _____ gm./l__ 36.7
- Common salt _____ gm./l__ 27.5
- Diazopon _____ cc./l__ 9.2
- 56% acetic acid (7.6 gm./l. acetic acid) cc./l__ 12.8

A brief description of the constituents of the naphtholate and color salts bath will be included though all are standard marketed items. The naphthol dyes are listed and described in the colour index, and because they function only in a non-acidic medium, caustic soda is added to the bath. Nullapon A and Eunaphthol AS are standard wetting agents and could be readily replaced by other similar materials. To provide a proper medium for the color salts and to neutralize the caustic soda from the first bath, acetic acid is included in the color salts bath. The diazotized amine color salts are also listed and described in the colour index, and diazopon is one of the common wetting agents which serves to make the color salts more reactive with the naphtholates.

To preserve a portion of the casing in its original colorless condition, a mask is applied to the surface. As chemical masks we have found that both hydrated ammonium alum—$(NH_4)_2Al_2(SO_4)_4 \cdot 24H_2O$—and hydrated aluminum sulfate—$Al_2(SO_4)_3 \cdot 18H_2O$—are suitable agents. Both chemicals inactivate the naphtholate dyes by neutralizing the soluble naphtholates to produce an insoluble product which is not reactive with a diazo compound. This results in the coating of the surface of the casing with a mask and thereby precludes that portion of the casing from being contacted by the color salts in the second dye bath. Certain other compounds, in addition to those stated above, suitable for "killing" or inactivating the naphtholate dyes, are the following: sodium aluminum sulfate, potassium aluminum sulfate, soluble ferric salts such as ferric sulfate and ferric chloride, soluble calcium and barium salts, sulfuric and the strong inorganic acids, formaldehyde, and the common halogen-containing and peroxide bleaches.

As was earlier stated, these masking means may be applied either before the casing enters the naphtholate bath or as it enters the color salts bath. It has, however, been found that the surface of the casing is better suited to masking if the aforementioned compounds are applied before the naphtholate bath. Application of these masks after the naphtholate bath produces tinted windows in most instances, probably for the reason that the concentration of naphtholate in the casing film is too high to be rendered inactive by a mere surface application of the inactivating compounds as masking means.

The use of absorbent wool felt or cellulose or rubber sponge on a roller is a particularly feasible way of applying these chemical masks to the casing but the method of using rollers is plagued by the problem of getting a sufficiently high concentration level of the masking material onto the casing film. This difficulty is fundamentally due to the low viscosity of the solutions and to overcome this problem the masking compounds can be thickened with natural or synthetic gums and other thickeners to approach the consistency of paste and thereby increase the available masking that can be spread on the casing by the rollers.

For chemically inactivating or "killing" the color salts in the second bath the following can be used as chemical masks: alkalies, oxidants including peroxides and the common halogen-containing bleaches such as those containing the hypochlorites. These compounds must, of course, be applied after the naphtholate bath since their purpose is to be present on the window portion of the casing to react with the color salts and thereby prohibit their interaction with the naphtholates to produce the color or surface dyeing phenomenon.

A similar method for preventing the dyes from contacting a portion of the casing and thereby to produce a window effect is to mask by mechaniscal means. According to their operative effect these materials can be described as dye resists in that they prohibit contact between the window portion of the casing and the dyes and in no way do they rely on a chemical reaction to inhibit dyeing. Resin emulsions including the urea formaldehyde types, paraffin wax emulsions, and animal, vegetable and appropriate synthetic glues or adhesives having the proper consistency to adhere or remain on the casing can be applied to advantage by an absorbent roller such as was discussed above. We also found another purely mechanical masking means that can be employed under certain operating techniques with good results. A three-inch gummed kraft paper tape was applied longitudinally to the casing after the wash bath in tank 18 and prior to the naphtholate bath. The tape was smoothed out and pressed as applied to insure adhesion. The mask remained on the casing through the naphtholate bath and the color salts bath and was removed after one pass in the dye wash bath. Where the selected paper mask is not sufficiently thick to prevent the dyes from soaking through to the casing it can be made water repellent. The additional requirement for such paper mask is that the adhesive used to cause the mask to adhere to the casing be of the water-soluble, and not of the pressure-sensitive, type since the latter will not adhere to the wet casing.

However, it is readily evident that the costs of such tape and the problem of disposing of it after its use are matters that militate against its use in any extensive way as a masking material. For these reasons, we have devised a method of mechanically masking the casing by maintaining a plastic belt of such substances as rubber, polyvinyl plastics such as Koroseal in contact with the casing as it passes through the napthtolate bath. Pressure contact between masking belt and casing to preclude seepage of dye underneath the mask can be effectuated by special means shown in Fig. 3. A continuous belt of the chosen plastic material of a width equal to the desired window width encircles rollers 25 to 27 inclusive. The window casing is fed into contact with the masking belt 28 at a point above rollers 29 which roller in conjunction with roller 30 above which the casing is removed from contact with the masking belt, maintains proper pressure contact between belt and casing as they pass around roller 27. The entire device is so positioned in the naphtholate dye bath that the level of the dye is always below those points at which the masking belt makes tangential contact with roller 27. In this way, and by virtue of the slidable mounting of rollers 29 and 30, there is always sufficient pressure contact between belt and casing between those points where they first enter and finally leave the dye bath.

It is evident that while we have described the masking of the casing in its longitudinal direction, such masking can be also effectuated in a transverse direction to produce a series of smaller window portions periodically along the length of the casing. And although we have specifically referred to a dyeing of regenerated cellulose casing, our masking process can be used to produce a window effect in the following films by employing various aniline dyes: polyvinyl type plastics, rubber hydrohalide films such as Pliofilm, copolymers of vinylidene chloride and acrylonitrile, modified styrene-butadiene copolymers such as the "Buna" synthetics, polyethylene, cellulose ethers, and cellulose esters. Resort may likewise be had to such other modifications as fall within the scope of the appended claims.

We claim:

1. In the process wherein casing is manufactured by the extrusion of seamless transparent tubing from cellulose derivative and which extruded tubing is thereafter passed, in succession, through a series of regenerating, washing and plasticizer-containing baths, the steps which comprise, after the seamless regenerated cellulose tubing leaves the final wash in which regenerating medium is removed therefrom, passing the wet tubing in collapsed condition through dye solution while masking a selected portion of its outer surface to prevent dyeing of said portion, removing excess dye solution from the outer surface of the tubing in a time interval before the dye permeates to the inner surface thereof so as to limit the dyeing effect to the unmasked outer surface portion of the tubular casing, and thereafter passing the tubing into a bath containing plasticizer.

2. In the process wherein casing is manufactured by the extrusion of seamless transparent tubing from viscose and which extruded tubing is thereafter passed, in succession, through a series of regenerating, washing and plasticizer-containing baths, the steps which comprise, after the seamless regenerated cellulose tubing leaves the final wash in which regenerating medium is removed, passing the wet tubing while in collapsed condition first through a naphtholate solution and then through a solution of diazo color salt which will couple with the naphtholate to dye the tubing, masking a selected portion of the outer surface of the tubing while passing it through one of said solutions to prevent dyeing of said portion, removing excess dye solution from the outer surface of the tubing within a time interval sufficient to prevent the dye permeating to the inner surface thereof so as to limit the dyeing effect to the unmasked outer surface portion of the tubular casing, and thereafter passing the tubing into a bath containing plasticizer.

3. Casing for the packaging of foodstuffs, said casing comprising collapsible, thin-walled, seamless tubing which consists of transparent, plasticized regenerated cellulose throughout its thickness, said regenerated cellulose tubing having the major area of its outer surface dyed with a naphtholate coupled diazo color salt which permeates the regenerated cellulose but to a depth less than the thickness thereof, the inner surface of said regenerated cellulose tubing being free of dye whereby no portion of the contents packaged in the casing will have contact with the dye, and the remainder of the outer surface of said regenerated cellulose tubing also being free of dye and possessing a clear colorless transparency through the thickness thereof to the opposite dye-free inner surface portion to provide a transparent area in the casing through which unimpaired visual inspection of the packaged contents may be had.

References Cited in the file of this patent

UNITED STATES PATENTS

| | | |
|---|---|---|
| 1,787,824 | Jones | Jan. 6, 1931 |
| 1,884,068 | Mendel | Oct. 25, 1932 |
| 1,997,769 | Fletcher | Apr. 16, 1935 |
| 2,121,021 | Cornwell | June 21, 1938 |
| 2,141,776 | Vautier et al. | Dec. 27, 1938 |
| 2,291,238 | Kimmick | July 28, 1942 |
| 2,346,417 | Cornwell et al. | Apr. 11, 1944 |
| 2,477,768 | Remer | Aug. 2, 1949 |
| 2,521,101 | Thor et al. | Sept. 5, 1950 |